(12) United States Patent
Theobald

(10) Patent No.: US 9,657,750 B1
(45) Date of Patent: May 23, 2017

(54) FLUID POWER DEVICE, METHOD AND SYSTEM

(71) Applicant: Vecna Technologies, Inc., Cambridge, MA (US)

(72) Inventor: Daniel Theobald, Somerville, MA (US)

(*) Notice: Subject to any disclaimer, the term of this patent is extended or adjusted under 35 U.S.C. 154(b) by 459 days.

(21) Appl. No.: 14/461,064

(22) Filed: Aug. 15, 2014

Related U.S. Application Data

(63) Continuation of application No. 12/880,486, filed on Sep. 13, 2010, now Pat. No. 8,915,073.

(51) Int. Cl.
*F15B 1/04* (2006.01)

(52) U.S. Cl.
CPC .................... *F15B 1/04* (2013.01)

(58) Field of Classification Search
CPC .. F15B 1/02; F15B 10/04; F15B 1/021; F15B 1/16
USPC .............. 60/412, 413, 414, 469; 138/26, 30
See application file for complete search history.

(56) References Cited

U.S. PATENT DOCUMENTS

| | | | | |
|---|---|---|---|---|
| 3,766,992 A * | 10/1973 | Tiraspolsky | ............... | E21B 4/02 138/30 |
| 3,902,318 A * | 9/1975 | Becker | ............... | B64C 13/40 60/388 |
| 4,211,078 A * | 7/1980 | Bass | ............... | F03G 7/08 185/27 |
| 4,565,487 A * | 1/1986 | Kroczynski | ............... | B62D 57/02 180/8.6 |
| 4,630,441 A * | 12/1986 | Chamberlain | ............... | F15B 7/006 60/391 |
| 5,181,380 A * | 1/1993 | Favre | ............... | F15B 20/004 60/405 |
| 5,249,631 A * | 10/1993 | Ferren | ............... | B08B 3/02 169/24 |
| 5,680,760 A * | 10/1997 | Lunzman | ............... | E02F 9/2228 60/426 |
| 5,682,923 A * | 11/1997 | Goloff | ............... | F16L 55/053 138/26 |
| 5,724,811 A * | 3/1998 | Gibby | ............... | F16H 61/38 60/409 |
| 5,758,734 A * | 6/1998 | Hong | ............... | B62D 57/02 180/8.1 |
| 5,806,705 A | 9/1998 | Herald, Jr. et al. | | |
| 6,076,557 A * | 6/2000 | Carney | ............... | F15B 1/103 138/30 |
| 6,776,356 B2 | 8/2004 | Maliteare | | |
| 7,059,127 B2 * | 6/2006 | Bauer | ............... | B60G 17/0152 60/416 |
| 7,108,015 B2 * | 9/2006 | Lombari | ............... | F16L 55/054 138/26 |
| 7,121,304 B2 * | 10/2006 | Gray, Jr. | ............... | F16L 55/053 138/26 |
| 7,395,663 B2 * | 7/2008 | Thompson | ............... | A01M 7/0075 60/403 |
| 7,395,748 B2 | 7/2008 | Krimbacher | | |
| 7,878,422 B2 * | 2/2011 | Heiniger | ............... | F15B 1/021 239/159 |

(Continued)

*Primary Examiner* — Thomas E Lazo
(74) *Attorney, Agent, or Firm* — Albert J. Brunett

(57) ABSTRACT

A fluid power device, method and system, the device including a passive, latent, integrally formed fluid reservoir member designed for operable communication with a transmission system, the reservoir member capable of at least absorbing any pressure increases in the transmission system and providing fluid back into the transmission system.

17 Claims, 6 Drawing Sheets

(56) References Cited

U.S. PATENT DOCUMENTS 8,434,524 B2 * 5/2013 Barth ..................... F15B 1/04
138/26
8,567,185 B1 * 10/2013 Theobald ................ B25J 9/144
60/413

* cited by examiner

FLUID POWER DEVICE, METHOD AND SYSTEM

FIELD OF THE INVENTION

The present invention relates generally to transmission systems and more particularly to fluid power transmission systems such as for hydraulic or pneumatic applications where part of the system may experience volume increases in the fluid (hydraulic fluid, air or gas) during operation.

BACKGROUND OF THE INVENTION

Actuators typically are mechanical devices that are used for moving or controlling a mechanism or system and typically convert energy into some type of motion. Examples of actuators can be found in any number of applications encountered in every day life including automotive, aviation, construction, farming, factories, robots, health care, and prosthetics, among other areas.

Every mechanical system designed to move or control a mechanism or system must have one or more "prime movers" to provide the energy or work needed and one or more "transmissions" to convey the energy or work from the prime mover to the object that is desired to be moved. Prime movers typically convert electrical or chemical energy to mechanical energy in the form of forces and displacements.

Examples of prime movers may include combustion engines, electric motors, biological/artificial muscles, piezoelectrics, shape-memory-alloys, magnetostrictives and dielectrics, among others. Examples of transmissions may include levers, linkages, wheels, gears, pneumatics and hydraulics, among others.

Pneumatic and hydraulic transmission systems are generally known and typically include one or more actuators and one or more valves in communication with a pump or the like that provides fluid (typically hydraulic fluid, air or gas) to the system at a fixed pressure. Such systems tend to be inefficient, costly and noisy.

Operating these transmission systems gets very complex, particularly when used within a sophisticated system that requires precise movements and may be subject to pressure spikes and/or negative pressure transients or the like. Additionally, many systems, particularly mobile systems such as vehicles, aircraft, robotics, unmanned vehicles, among other mobile systems, require reliable constant performance with no chance of system failure while providing highly efficient operation in very demanding applications to ensure proper operation of the system at all times.

This is particularly true where the orientation of the system can have an effect on the operation of the system such as in aviation or robotics, for example. Traditional systems can only provide the appropriate fluid pressure to the system in certain orientations of the system which limits the system mobility.

SUMMARY OF THE INVENTION

A fluid power device, method and system, the device including a passive, latent, integrally formed fluid reservoir member designed for operable communication with a transmission system, the reservoir member capable of at least absorbing any pressure increases in the transmission system and providing fluid back into the transmission system.

BRIEF DESCRIPTION OF THE DRAWINGS

The following detailed description will be better understood when read in conjunction with the appended drawings, in which there is shown one or more of the multiple embodiments of the present disclosure. It should be understood, however, that the various embodiments of the present disclosure are not limited to the precise arrangements and instrumentalities shown in the drawings.

DETAILED DESCRIPTION OF THE INVENTION

Figure 1:
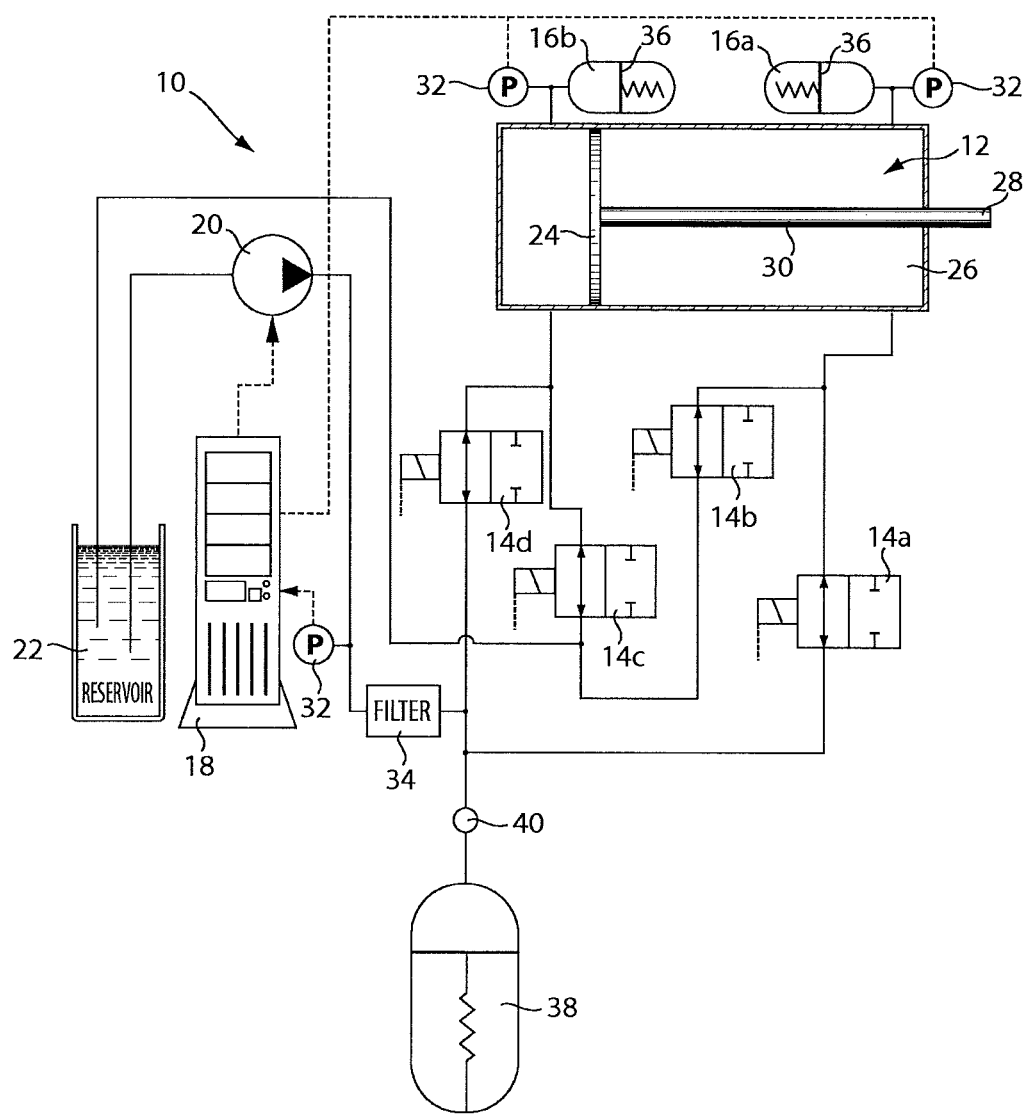
FIG. 1 is a schematic view illustrating one example of applicant's smart hydraulic system that can be utilized in conjunction with the teachings of the present invention.

The present invention will be described in detail with reference to embodiments that represent examples of the present invention and are not intended to limit the scope of the invention. Although specific elements and configurations are described to provide an understanding of the invention, it is to be understood that the specific embodiments, elements and configurations provided are for illustrative purposes only. Other configurations will be recognized by those of ordinary skill in the art without departing from the teachings of the present invention or the scope of the appended claims.

The present invention is directed to smart hydraulic actuators (SHAs), a term coined by applicants that achieve shock absorption and remarkable novel energy efficiencies, among other features, with superior controllability using novel integrated valves, pressure sensors, accumulators, computer controlled pumps and advanced control algorithms. Examples of these systems can be found in applicant's co-pending U.S. application Ser. No. 12/705,993, entitled "Passive Impedance Control for an Actuator", Ser. No. 12/705,995, entitled "High Efficiency Actuator, Method, System and Apparatus" and Ser. No. 12/731,270, entitled "Task Flexibility for Actuators", the disclosures of which are hereby incorporated by reference.

Such systems can provide a hydraulic or pneumatic system with more than many times the power density of non-hydraulic or pneumatic systems while achieving the same or even better efficiency. Since hydraulic systems typically are very inefficient with the majority of energy being wasted, providing a hydraulic system having an efficiency equal to or greater than other systems, such as systems having electric motors, is an incredible, novel advance in the art.

In an electronic system, for example, multiple motors typically are employed to accomplish various tasks or movements such as in a robot, for example. In these types of systems the weight of the individual motors, batteries and transmissions is very high while the power output is low thereby providing a low power density.

In a pneumatic system, the compressibility of air provides another variable that may be somewhat harder to control, particularly when fine motor control is needed. The success of such systems can depend on the load to be lifted where low loads may be readily accommodated but for higher loads the compressibility of air becomes more of a factor and fine motion control is more difficult.

Robots typically are only capable of the lightest of labor due primarily to the poor power density achievable in high degree of freedom systems having many joints where a separate motor or prime mover is used for each joint. The present invention enables many times improvement in power density by using a transmission system, such as a hydraulic or pneumatic system for example, that allows one prime mover to provide power to many joints at the same time.

In use, rarely, if ever, does a robot need to use all its joints at full power at the same time. Thus, the present invention provides an opportunity to share a prime mover among several joints by using a transmission that can split and transmit the work provided by the primer mover to several joints as needed.

The present invention also allows for energy recapture, as described below, thereby providing additional energy savings in a variety of applications such as robotics, automotive, aviation and construction, among other areas. Systems that provide for energy recapture are of most interest in today's environment since they can reduce energy consumption thereby providing a "green" alternative to traditional systems.

Briefly, to enable energy recapture, energy and/or potential energy is captured during a phase of operation and stored for use in a later phase of operation instead of having to expend energy from the prime mover. The more energy that can be captured and stored and the longer the period of storage the more energy efficient the system.

The present invention provides a novel fluid reservoir member for capturing fluid volume increases in the system and providing fluid back into the system either substantially simultaneously or subsequent to capturing the fluid volume as described in more detail below. Not only does this novel reservoir provide distinct advantages over existing devices, but its design and form factor enable distinct performance advantages over existing devices and applications not previously contemplated let alone possible.

The fluid reservoir member of the present invention also provides for a variety of features such as, for example, absorbing pressure spikes, providing significant system efficiencies, providing "boot strap" capabilities and providing an "explosive power" feature as described below. It is to be understood, however, that the scope of the appended claims is not to be limited in any way to these particular features.

Two features of the fluid reservoir member, among others, are that it is both a "passive" type of device as well as a "latent" device. Is it passive in the sense that it does not require any additional energy to be expended for it to operate as intended and it is latent in that it is not readily visible or obvious but is present and capable of operating as desired and can be a substitute for other system components, among other definitions and features.

FIG. 1 generally illustrates a smart hydraulic system 10 that can be utilized in conjunction with the teachings of the present invention. It is to be understood, however, that the present invention can be used in any other type of hydraulic system as well as non-hydraulic applications if desired and the term "fluid" herein includes any type of hydraulic fluid or gas, including air or the like, as is well known in the art.

The main components of the system 10 include an actuator 12, a plurality of valves 14a-14d, two accumulators 16a and 16b, a CPU or other computing device or the like 18, a computer controllable variable output pump 20 and a fluid reservoir 22. Although the system 10 in this embodiment is illustrated with regard to a hydraulic application, it is to be understood that the system 10 can be employed with pneumatic or any other non-hydraulic applications if desired and the particular components used as well as the number and position of those components may vary so long as they fall within the scope of the appended claims.

As mentioned above, an actuator typically is some type of mechanical device used for moving or controlling a mechanism or system and typically converts energy into some type of motion. Examples of actuators can be found in any number of applications encountered in every day life including automotive, aviation, construction, farming, factories, robots, health care, and prosthetics, among other areas.

Although designs may vary, a hydraulic or pneumatic actuator typically takes the form of actuator 12 where a piston 24 is positioned within a cylinder or chamber 26 with the end 28 of a connecting rod 30 of the piston 24 extending to the outside of the chamber 26. The piston 24 is moved back and forth within the chamber 26 by varying the fluid or gas pressure on either side of the piston 24 so that the rod end 28 can contact various members external to the actuator 12 (not illustrated) to provide the desired effect.

One example of the use of such an actuator 12 would be in robotics (not illustrated) where the rod end 28 typically is connected to another member, say an arm joint or other type of structure. By moving the rod end 28 back and forth the robot arm can be raised and lowered a desired amount. Complex mobile robots can have dozens of actuators 12 used to provide various motions to the robot. The system 10, when utilized with a complex robot or the like, enables a plurality of actuators 12 (see FIG. 15) to be controlled by the same hydraulic fluid and control system thereby reducing the number of components and overall weight, among other benefits, and providing uses that previously have been at least impractical if not impossible.

A number of pressure sensors 32 also can be employed at various points about the system 10, each sensor 32 preferably being connected to the CPU 18. A filter 34 may also be included if desired. One or more central or system accumulators 38 along with a valve 40 also can be included if desired. Additional details of the system 10 and its various components can be found in applicant's co-pending applications incorporated by reference above.

Figure 2:
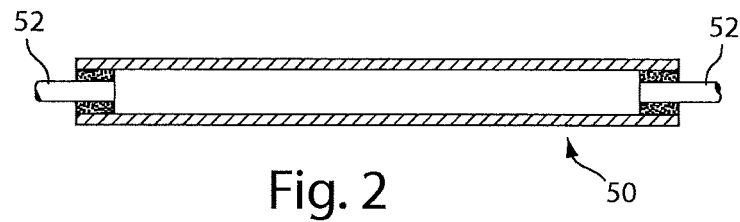
FIG. 2 is a cross-sectional view illustrating one embodiment of the fluid reservoir member of the present invention.

FIG. 2 generally illustrates a fluid reservoir member 50 of the present invention for use in the system 10 or any other desired system. The reservoir 50 essentially is an elongate tube preferably designed for in-line applications, although non-in-line or other applications are possible. When used in an in-line type of application, the reservoir 50 can take the place of a section of hose for the fluid which provides distinct advantages over existing systems and components as described herein.

The reservoir 50 is joined to system lines 52 at opposite ends of the reservoir 50 in any type of manner, including any mechanical member, adhesive, welding, or any other type of joining method. The reservoir 50 preferably is formed from any type of elastically deformable material so that if expanded and/or repeatedly expanded it can substantially return to its original state. It is to be understood that the particular material of the reservoir 50 can vary so long as it functions as desired.

Figure 3:
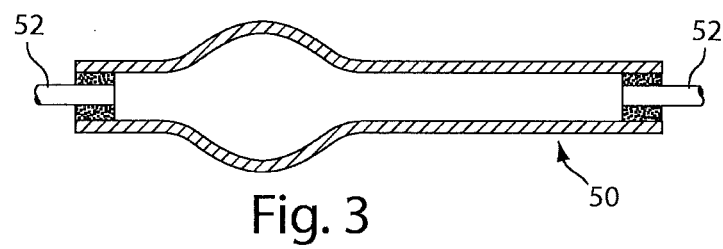
FIG. 3 is a cross-sectional view, similar to FIG. 2, illustrating a position of the fluid reservoir member of the present invention.

Briefly, in operation, upon exposure to a particular amount of fluid volume or pressure in the system the reservoir 50 can expand from a first, at rest position illustrated in FIG. 2 to at least a second, expanded position illustrated in FIG. 3 and can capture and hold additional fluid. The expanded position of FIG. 3 typically expands the reservoir 50 along at least a portion of its length in an outward direction substantially normal to the longitudinal centerline of the reservoir 50 and essentially forms a bulge in the reservoir 50. The position of the bulge can vary and in this embodiment the material selected for the reservoir 50 by itself dictates the extent of the outward expansion and can be selected for use in a desired application based primarily on the fluid volume or pressure desired, among other factors.

Figure 4:
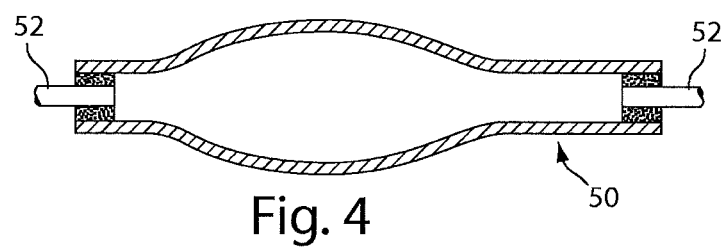
FIG. 4 is a cross-sectional view, similar to FIGS. 2 and 3, illustrating another position of the fluid reservoir member of the present invention.

As FIG. 4 illustrates, due primarily to its elongate shape and selection of material, upon continued exposure to additional fluid volume or pressure the reservoir 50 extends more along its length rather than normal to its centerline. This unique design enables a number of novel features including, but not limited to, enabling capturing and storage of excess fluid or gas in a substantially linear direction which can be more readily incorporated into the design of the system as will be described in more detail herein.

In essence, the reservoir 50 functions somewhat similar to a capacitor in an electrical system except the capacitor typically does not provide a constant charge. The reservoir 50 essentially stores energy as it expands to accept the increased fluid volume and provides constant or substantially constant pressure to the system in return.

Figure 5:
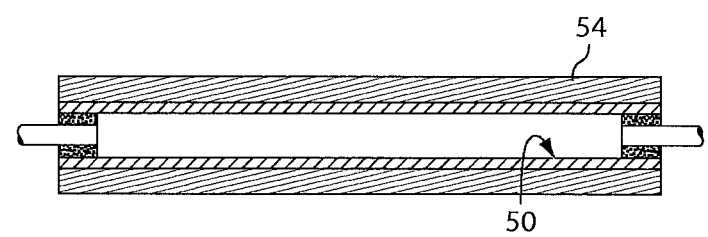
FIG. 5 is a cross-sectional view illustrating another embodiment of the fluid reservoir member of the present invention.

FIG. 5 illustrates another embodiment of the reservoir 50 that includes a reinforcement member 54 illustrated about the external periphery of the reservoir 50. The reinforcement member 54 can be formed from any material and when utilized in conjunction with the material selected for the reservoir 50, enables a particular amount of deformation selected for a particular application without causing the reservoir 50 to break. It is to be understood, however, that the shape, material and position of the reinforcement member 54 can vary, and the reinforcement member can be integrally formed to or positioned within the material of the reservoir 50 or part of a layered or sandwiched type of reinforcement (not illustrated) without departing from the teachings of the present invention.

Figure 6:
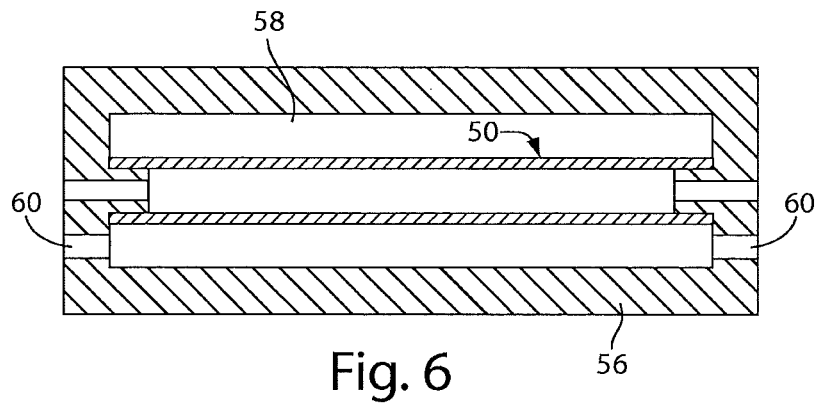
FIG. 6 is a cross-sectional view illustrating another embodiment of the fluid reservoir member of the present invention.
Figure 7:
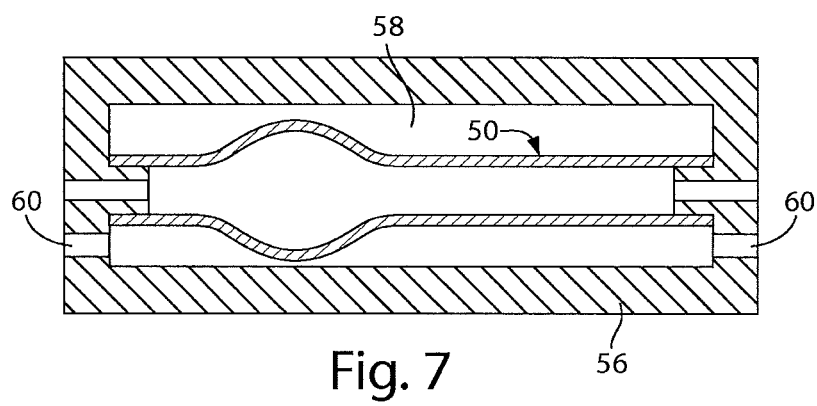
FIG. 7 is a cross-sectional view, similar to FIG. 6, illustrating a position of the fluid reservoir member of the present invention.
Figure 8:
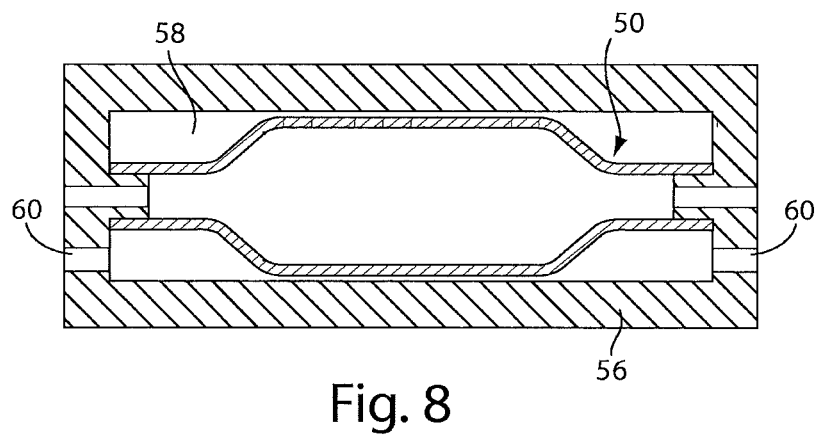
FIG. 8 is a cross-sectional view, similar to FIGS. 6 and 7, illustrating another position of the fluid reservoir member of the present invention.

FIGS. 6-8 illustrated another embodiment of the reservoir 50 of the present invention. In this embodiment, the reservoir 50 preferably is enclosed within some type of restraining member 56. The restraining member 56 preferably is an elongate cylindrical member but can be any desired shape so long as it functions as desired herein.

The restraining member 56 includes an interior portion 58 and at least one outlet orifice 60 that preferably vents the interior portion 58 to atmosphere or elsewhere, but can vary, and two orifices 60 are illustrated by way of example. The orifice 60 enables the reservoir 50 to function as a reservoir, particularly a pressurized reservoir, to provide constant pressure to the system 10 without the need for a typical reservoir or tank that usually is non-pressurized. Of course, various circuits can be used with the reservoir 50 of the present invention including circuits with multiple reservoirs 50 and one or more non-pressurized reservoirs if desired, some examples of which will be described herein.

The restraining member 56 can extend over the entire length of the reservoir 50 or one or more selected portions thereof and can serve to limit the outward expansion of the reservoir 50, if needed, in a direction substantially normal to the longitudinal centerline of the reservoir 50. Of course, the restraining member 56 can provide a number of other features to the reservoir 50, such as protection from the elements or damage from external forces or the like.

Figure 9:
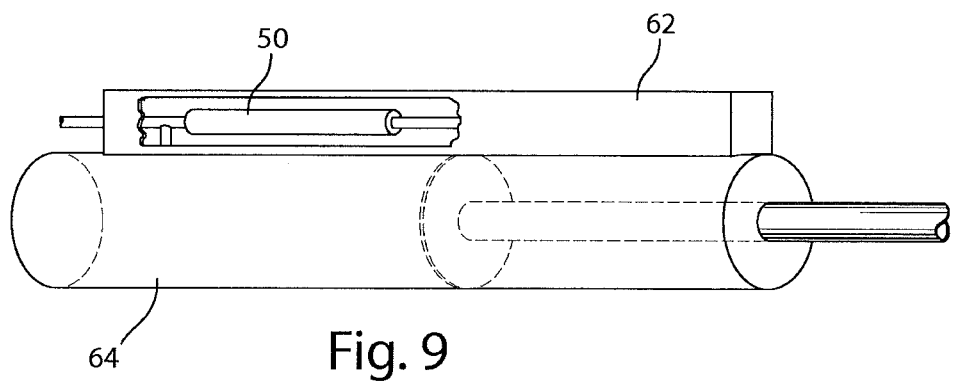
FIG. 9 is a perspective view of an actuator illustrating in partial section another embodiment of the fluid reservoir member of the present invention.

As FIG. 9 illustrates, the reservoir 50 can also be used in conjunction with any type of structural body portion 62 of an apparatus that utilizes the system 10, such as a vehicle, robot, aircraft, heavy equipment or the like. In this embodiment, the body portion 62 can take on similar functions as the restraining member 56 while providing fewer elements, less weight and closer proximity to an actuator, such as actuator 64, for example. This feature can provide significant design and efficiency advantages that work in tandem with other efficiency techniques of applicant to provide a unique approach to hydraulic and other applications not previously contemplated yet solving a long felt need.

Figure 10:
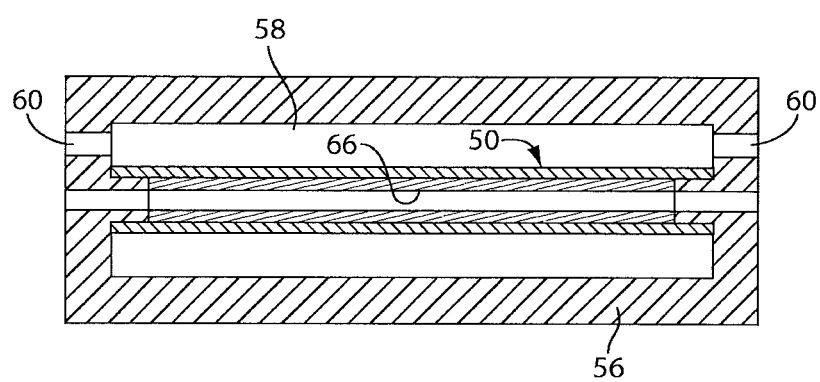
FIG. 10 is a cross-sectional view illustrating another embodiment of the fluid reservoir member of the present invention.

FIG. 10 illustrates another embodiment of the reservoir 50 that includes an interior reinforcement member 66 that can be in the form of a stent or similar article and can be formed as part of the material of the reservoir 50 itself. The reinforcement member 66 can extend over the entire length of the reservoir 50 or one or more selected portions thereof and can serve to prevent the reservoir 50 from collapsing under any potential negative pressure spikes that may occur. As with the restraining member 56, the reinforcement member 66 can serve other purposes such as protection against wear or any other desired feature.

FIGS. 11-14 illustrate basic circuits demonstrating a few of the many possible configurations of a system utilizing the reservoir 50. It is to be understood that the present invention is not to be limited to any particular system or arrangement of the reservoir 50 and can include any number of valves 40, sensors 32 or other desired components without departing from the teachings of the present invention. In these circuits additional components are not illustrated, particularly those on the high pressure side of the valves 40 that link up to close the circuit.

Figure 11:
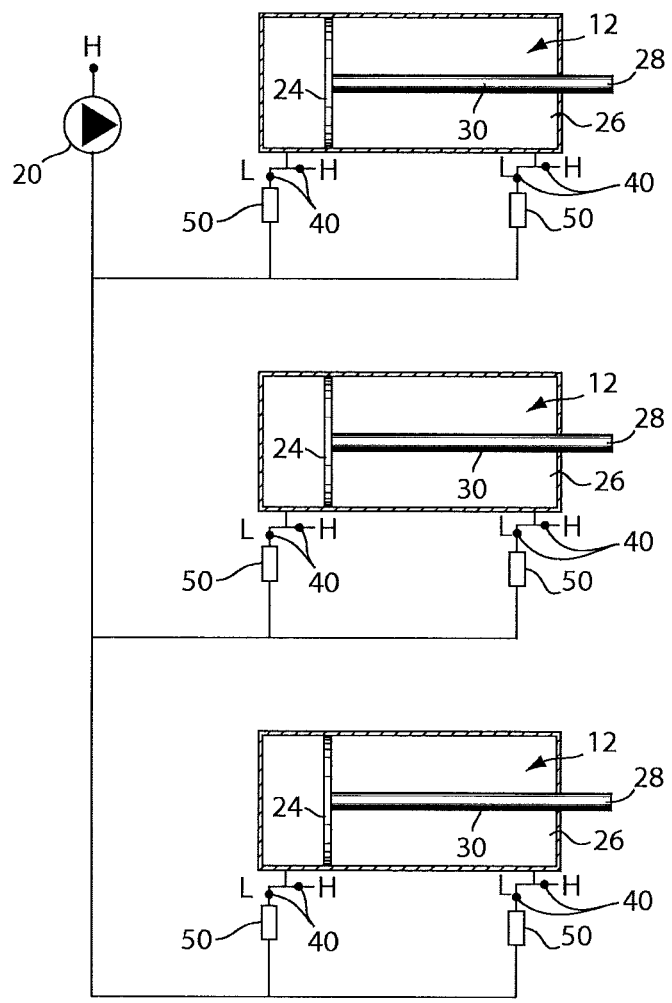
FIG. 11 is a schematic view illustrating an embodiment of the fluid reservoir member of the present invention in one embodiment of a transmission system.

FIG. 11 illustrates another embodiment of the present invention where multiple actuators 12 are used with a single pump 20 and multiple reservoirs 50, at least two each for each actuator 12 along with a number of valves 40 as desired. Although three actuators 12 are illustrated, the number can vary as well as the specific arrangement of the actuators 12 and reservoirs 50. With this arrangement, pressure capture and storage can be accomplished with each individual actuator for later use while providing additional advantages in control and efficiencies.

Figure 12:
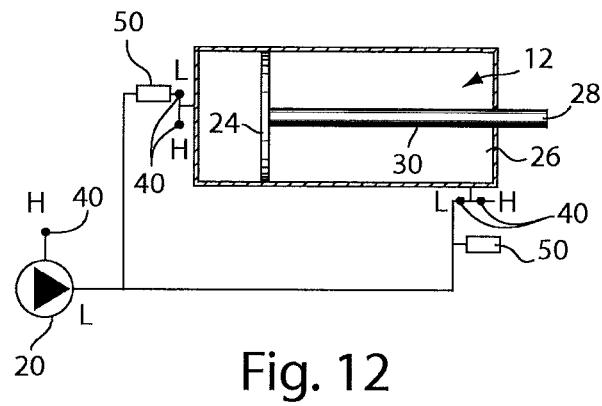
FIG. 12 is a schematic view illustrating an embodiment of the fluid reservoir member of the present invention in a different transmission system.

In FIG. 12, one reservoir 50 is positioned in a non-in-line manner that may be desirable in a number of applications. In this embodiment, system pressure can by pass the reservoir 50 if needed particularly if a valve (not illustrated) is positioned just outside the reservoir 50 to control its activation. As in other embodiments, various other valves, sensors, CPUs, or other desired components can be included without departing from the teachings of the present invention.

Figure 13:
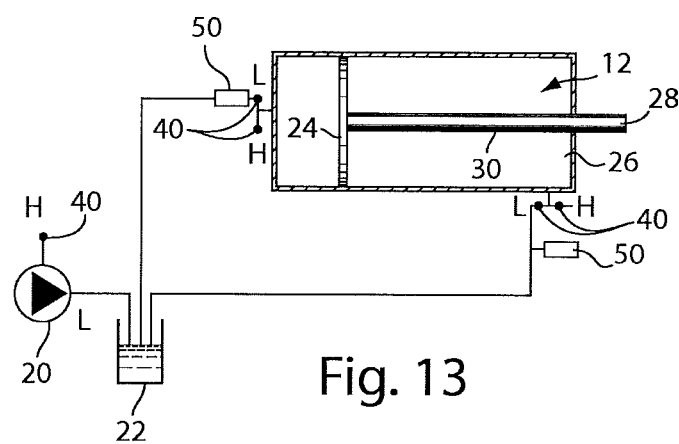
FIG. 13 is a schematic view illustrating an embodiment of the fluid reservoir member of the present invention in yet a different transmission system.

In FIG. 13, two reservoirs 50 are illustrated, one each on either side of the piston 24 of the actuator 12 as well as a conventional non-pressurized reservoir 22.

When at least two reservoirs 50 are utilized as illustrated in FIGS. 12 and 13, more precise control of the actuator 12 can be obtained, particularly when used in a computer controlled system with various valves and sensors as described herein. This configuration also enables accommodating a rapid movement or "explosion" of fluid or gas into one side of the piston 24 if desired.

For example, during operation of the system it frequently is desirable to provide rapid movement of the apparatus or component of the apparatus that is being affected by the system, such as a vehicle, robot, aircraft, unmanned vehicles and including any non-mobile vehicles. In a robot application, for example, it is often desirable to provide rapid movement of fluid or gas into the actuator 12 to in turn cause a robot to jump several feet in the air. Of course, the heavier the robot and the higher the jump needed the more rapid movement of fluid needed.

If the reservoir 50 is used with either a variable pressure pump 20 or a constant pressure pump (not illustrated but contemplated as part of the present invention) one of either reservoir 50, depending on the motion needed of the piston 24, can be used to store energy at high pressure during running of the pump or captured during operation of the system. Storage essentially is accomplished by the proper manipulation of valves at various points about the system.

In either case, when an explosion is needed, the valve (not illustrated) opens thereby allowing the surge of pressure from the reservoir 50 into one side of the actuator 12 causing the piston 24 to move rapidly and provide the desired movement, such as a robot jumping for example.

If, however, a second reservoir 50 is not positioned on the other side of the piston 24 little if any rapid movement of the piston 24 will occur, due to back pressure in the system, since it will have to displaced fluid or gas on the other side of the piston 24 and in the fluid lines leading to a non-pressurized reservoir, such as reservoir 22. With no place for that fluid or gas to go due to the transient back pressure, the piston 24 substantially remains still even against the high pressure being exerted against one side of the piston 24.

By positioning a second reservoir 50 on the opposite side of the piston 24 as contemplated by the present invention the surge of fluid can be absorbed by the second opposite reservoir 50 and, since it preferably is positioned close to the actuator 12, the motion of the piston 24 can be quite quick enabling the desired rapid movement or explosive action of the fluid and desired movement.

Figure 14:
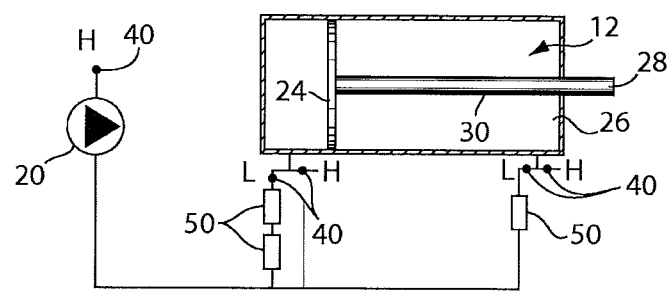
FIG. 14 is a schematic view illustrating an embodiment of the fluid reservoir member of the present invention in yet another different transmission system.

FIG. 14 illustrates another embodiment of the present invention where multiple reservoirs 50 are used, at least two of which are placed back-to-back. This type of arrangement enables what applicant refers to "distributed reservoirs" that can not only help distribute excess system fluid or gas throughout the system but each reservoir 50 can have been designed to accept different pressures.

Trying to employ large, heavy, expensive reservoirs in such a distributed system makes no sense, particularly in mobile applications. There simply is no place to put them, particularly in robotic and aerospace applications. In contrast, the relatively small, efficient, inexpensive, dependable reservoirs 50 readily can be deployed in a distributed manner in mobile systems with tight space and weight requirements for at least obtaining flexibility in system performance, among other advantages.

Preferably, the reservoirs 50 can be placed in the system so that downstream pressure in the system is higher than upstream pressure in the system, but can vary. This means that the reservoir 50 positioned downstream is designed to expand at a higher pressure, say 50 psi, while the upstream reservoir 50 is designed to expand at a lower pressure, say 25 psi.

The reservoir 50 can also be employed in what is called a "boot strap" type of application that typically is employed for mobile applications where high precision and reliability are needed, such as aerospace, vehicles and robotics, to name a few areas. In a boot strap system two hydraulic cylinders are placed back to back. Once cylinder has a high pressure (say 3,000 psi, for example) and the other cylinder has a low pressure (say 30 psi, for example) and is directly linked to the operation of the system.

In this type of application, the high pressure cylinder is used to pressurize the low pressure cylinder at all times, including during movement of the aircraft or robot and essentially negates any system orientation effects. Problems with existing boot strap systems are that they are big, expensive, bulky and inefficient, the low pressure side varies with the high pressure side and need to maintain the high pressure side at high pressure all the time which is incredibly inefficient and any power savings from energy recapture would merely be wasted.

One or more reservoirs 50 can take the place of these two pressure cylinder boot strap systems since they can supply the needed constant pressure to the system regardless of the orientation of the aircraft, vehicle or robot after charging them and are not dependent on any particular high-side pressure to be maintained. Due to the small size, compact design, and low cost the reservoirs 50 provide a unique solution to a long standing problem.

The CPU 18 can be any desired type of CPU so long as it can execute the software and novel algorithms necessary to monitor and control the system 10 as desired. The pump 20 preferably is a variable pressure pump, such as an electric variable pressure pump, that can be controlled by the CPU 18, but any type of pump can be employed. The reservoir 22 preferably is selected to perform according to the requirements of the system 10 and typically is a sealed reservoir (not illustrated). It is to be understood, however, that the size, type and design of the CPU 18, pump 20 and reservoir 22 can vary without departing from the teachings of the present invention.

The smart system 10 relies on at least three key design modifications to provide the unique features of the present invention. First, rather than running the pump 20 at a constant high pressure, the pump 20 is only run to provide the pressure needed at the moment and, as much as possible, move few actuators 12 at the same time to reduce throttling losses, if any, among other features.

Second, instead of merely managing the pressure in and out of one side of the actuator 12 only, charge and manage the pressure on each side of the actuator 12 independently. This not only allows for more precise control but enables true passive impedance control, maximizes energy savings and allows for energy recapture.

Passive adjustable impedance is achieved by charging accumulators 16a and 16b on both sides of the actuator 12. The non-linear relation between accumulator charge and external force makes adjustable impedance control possible.

Finally, the control valves 14a-14d in the present invention are positioned as close as possible to the actuator 12 and may be integrally formed with the actuator 12 themselves as illustrated in FIG. 2. This leads to increased responsiveness due to shorter fluid travel distances along with a decrease in piping losses due to friction or the like both of which can be substantial and contribute to "dead-band" (described in more detail below) which prevents precise control of the actuator 12 and severely limits use of hydraulic actuators.

Conventional hydraulic systems (not illustrated) typically are inefficient, large, heavy, noisy and expensive since they tend to emphasize controllability at the sake of these other factors, among others. These over sized, constant maximum-pressure systems tend to provide a pump powerful enough to supply the maximum flow needed for all actuators that might be on at the same time while maintaining the set, very high system pressure to avoid the problem of pressure fluctuations as valves are opened and closed and essentially decouples actuators to simplify control problems.

Although such over sized/max pressure systems may reduce control problems associated with coupling actuators together (i.e. having one actuator influence other actuators 12 as in the present invention) controllability of the individual valves is sacrificed. More particularly, it is more difficult to control fluids at higher pressure differentials. On the other hand, since it's simply easier to control fluids at lower pressure differentials as in the present invention than at higher pressure differentials providing fine motion control is much easier at such lower pressure differentials. In addition, it is relatively harder to control flow with hydraulic valves compared to controlling the flow of fluid with a pump providing an incentive to control fluid flow at the pump as much as possible as in the present invention particularly when fine motion control is needed.

It also is to be noted that coupling multiple actuators to a single source of fluid supply is typically not implemented by existing hydraulic and even pneumatic systems. One reason is that the actuators typically have specific operating constraints and are individually controlled for proper operation. There is no interest in coupling actuators in such systems since it would be harder to control these systems. As explained in more detail below, the present invention teaches away from the mainstream thinking by coupling actuators to enjoy several advantages not possible with existing systems.

By running the pump 20 only at the pressure needed at the moment a number of advantages are provided by the present invention. Since the majority of the noise that may be generated by the system 10 typically is provided by the prime mover such as the pump 20, by keeping the pressure lower the pump 20 runs less and contributes less noise.

Additionally, running at a lower pressure more of the time is easier on the overall system 10 including the lifetime of the components of the system 10 and reduces potential leaks since not running at a high pressure all the time. Thus, the system 10 of the present invention addresses noise and leakage that are at least two concerns with hydraulic and sometimes pneumatic systems.

In the present invention, the pressure spike provided by an impact is reduced or eliminated before it can cause a leak or damage to the components of the system 10. This is accomplished by enabling at least the accumulators 16a and 16b and/or reservoir(s) 50 to passively store the energy from the pressure spike. In situations where the pressure spike may be quite large, the accumulators 16a and 16b and/or reservoir(s) 50 spread out the pressure event and buy a fractional amount of time to enable the system 10 to provide additional passive or active impedance control and absorb and/or store the larger pressure spike.

Thus, the accumulators 16a and 16b and/or reservoir(s) 50 enable the system 10 to absorb a higher displacement of the piston 24 of the actuator 12 in nano-seconds without damaging the components of the system 10. The accumulators 16a and 16b and/or reservoir(s) 50 preferably are designed to be large enough to enable enough time to allow the system 10 to switch from passive impedance provided by the accumulators 16a and 16b and/or reservoir(s) 50 to active impedance provided by the valves 14a-14d.

When hydraulic fluid transitions from a high pressure to a lower pressure (such as through a valve, orifice or the like) without extracting the energy as useful work, the energy is wasted as heat. This transition is known as "trottling" and creates substantial inefficiencies and should be avoided whenever possible when energy efficiency is important.

As an example, when a hydraulic system is used to raise objects of various weights the system fluid pressure may be maintained at 500 psi or more selected in anticipation of the maximum load or weight the system may be required to move. When the weight being lifted is approximately equal to the system pressure, only minimal fluid energy is lost to heat.

In contrast, when the weight being lifted is less than the system pressure a substantial amount of the fluid energy is lost to heat, typically from throttling, whereby substantially more total energy is used than is necessary to lift the lighter weight. In many applications using ten times more energy (or higher) than is necessary to lift the lighter weight is typical.

Since this excessive energy is in the form of heat, the heat can build up quickly and must be adequately dissipated to avoid affecting system performance or failure. Traditionally, dissipating heat is achieved by providing a large fluid reservoir that enables the fluid to cool down. Providing large fluid reservoirs for cooling is not possible in many applications, such as mobile robotics, and has severely limited the use of hydraulics in many environments that could benefit from the advantages of hydraulics.

When a transmission system, such as a hydraulic system or the like, is actuated to lift an object say off the ground to a particular height a portion of the energy used to lift the object is converted to gravitational potential energy now stored in the object just lifted. If the system has a 50% efficiency rating, essentially half of the energy was wasted, likely as heat, and half is still stored as potential energy in the object.

When the system is actuated to later set the object back down on the ground, it stands to reason that the system should expend less energy to do so since gravity should be able to assist. In most systems, however, particularly hydraulic systems, it typically takes just as much energy to place the object down as it did to lift it up since pressure alone is used to both raise and lower the object without being able to take advantage of the gravitational potential energy stored in the object.

Due to the unique arrangement of the system 10 of the present invention, recapturing this gravitational potential energy can be accomplished. The smart control system 10 and valve arrangement of the present invention, among other features, can independently connect either side of the hydraulic cylinder 26 to either pressure or tank/reservoir 22 to create the possibility of energy recapture. For example, the system 10 can connect both sides of the cylinder 26 or actuator 12 to tank/reservoir 22 allowing gravity to pull the object down while the cylinder 26 acts as damper to control the rate of fall of the object.

The system 10 can also connect both sides of the cylinder 26 or actuator 12 to pressure from the pump 20 which, depending on the orientation of the cylinder 26, will either waste a little energy than gravity would pull the object down on its own or instead recapture energy by forcing some of the high pressure hydraulic fluid back into other parts of the system 10. Finally, the system 10 can connect one side of the cylinder 26 or actuator 12 to pressure and one side to tank/reservoir 22 thereby pushing the complete volume of fluid back into the high pressure system 10.

Variables with these operations include how fast the object is to be moved, the current system pressure and whether one or more joints are operating at the same time that could make immediate use of the high pressure fluid, among other variables.

As FIG. 1 illustrates, the system 10 of the present invention may also provide additional energy recovery and storage capabilities by including one or more additional central accumulators 38. The accumulator 38 may preferably include valve 40 that can be controlled by the CPU 18.

When an actuator 12 is used to move another member, such as a robot arm, for example, the arm can be susceptible to impact as described above. On impact of the arm from another object, the piston 24 in the actuator 12 acts like a pump and puts pressure in the system 10.

When this occurs, the valve 40 can be opened to allow the pressure surge or spike to be absorbed and captured by the central accumulator 38. Thereafter, the valve 40 can be closed to keep the energy captured within the accumulator 38 to be stored therein.

In the future, if the system 10 needs additional pressure rather than run the pump 20 to provide the higher pressure the valve 40 can be opened and the stored energy within the central accumulator 38 can be released to the system 10. This essentially provides a power boost to enable the system 10 to run at a higher pressure without expending any additional energy.

Similarly, when a force is pulling on the piston rod 30 the increase in pressure in the system 10 can be used in other portions of the system 10 particularly if the system 10 is coupled to additional actuators 12. For example, assume the rod 30 is connected to a robot arm that is holding a weight and gravity pulls on the arm and in turn the rod 30.

If higher pressure is needed elsewhere in the system 10, such as by another actuator (not illustrated) there is no need to run the pump 20 since the valves 14a-14d can be activated to supply the needed higher pressure. In such a situation, the system 10 can let the external force provided by gravity maintain the system 10 at the current desired pressure or provide an increase in pressure as described.

This energy recapture provided by the accumulator 38 also can be provided by one or more reservoirs 50 with or without the accumulator 38. When multiple reservoirs 50 are utilized, they can be placed about the system in various positions and at various pressures to capture fluid volume increases during movement of the robot or other member for subsequent or simultaneous use by the system.

The unique design of the reservoir 50 enables this simple, easy, distributive system since they can be placed in a variety of areas not capable with existing components. Multiple reservoirs 50 can be used in series or in parallel to obtain significant advantages in energy efficiency that directly contributes to extensions in the power life cycle of aircraft, robots and vehicles or the like.

Although various systems can be used for various applications, when a high strength mobile system is needed a hydraulic system typically is preferred. Such systems can provide very high power transmission rates since they can parlay the power initially provided to the pump into energy increases thousands of times greater.

In addition to the unique arrangement of the system 10 as described above, applicant's contend that a hydraulic system with ten times the power density of non-hydraulic systems while achieving equivalent or even better efficiency and controllability than non-hydraulic systems is achievable according to the teachings of the present invention. More particularly, by combining the unique system 10 of the present invention with task flexibility at the planning and control levels significant opportunities exist for revolutionary improvement to hydraulic or similar systems.

The embodiments of the present disclosure may be implemented with any combination of hardware and software. If implemented as a computer-implemented apparatus, the embodiments of the present disclosure are implemented using means for performing all of the steps and functions described above.

The embodiments of the present disclosure can be included in an article of manufacture (e.g., one or more computer program products) having, for instance, computer useable media. The media has embodied therein, for example, computer readable program code means for providing and facilitating the mechanisms of the embodiments of the present disclosure. The article of manufacture can be included as part of a computer system or sold separately.

Although the description above contains many specific examples, these should not be construed as limiting the scope of the embodiments of the present disclosure but as merely providing illustrations of some of the presently preferred embodiments of this disclosure. Thus, the scope of the embodiments of the disclosure should be determined by the appended claims and their legal equivalents, rather than by the examples given.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the embodiments of the present disclosure.

The invention claimed is:

1. An assembly, comprising:
   a body member configured as a structural body portion of an apparatus; and
   a passive, integrally formed fluid reservoir member designed for operable communication with a transmission system, the reservoir member configured to absorb a fluid volume increase in the transmission system and provide fluid back into the transmission system;
   wherein the reservoir member is latently arranged with the body member and wherein the reservoir member is formed as a substantially elongated member expandable along at least a portion of its length in a direction substantially normal to a longitudinal centerline of the reservoir member.

2. The assembly as defined in claim 1, wherein the body member visually obscures the reservoir member.

3. The assembly as defined in claim 1, wherein the body member disguises the reservoir member.

4. The assembly as defined in claim 1, wherein the reservoir member is substantially enclosed within the body member.

5. The assembly as defined in claim 1, wherein the apparatus comprises a vehicle.

6. The assembly as defined in claim 1, wherein the apparatus comprises a robot.

7. The assembly as defined in claim 1, wherein the apparatus comprises an aircraft.

8. The assembly as defined in claim 1, wherein the apparatus comprises heavy equipment.

9. The assembly as defined in claim 1, wherein the reservoir member is integrally formed from an elastically deformable material.

10. The assembly as defined in claim 1, further comprising reinforcement for the reservoir member to prevent collapsing of the reservoir member under potential negative pressure in the system.

11. The assembly as defined in claim 1, further comprising reinforcement for the reservoir member to prevent over expansion of the reservoir member under potential high volume and/or pressure transients in the system.

12. An apparatus, comprising:
a transmission system; and
a passive, integrally formed fluid reservoir member designed for operable communication with the transmission system, the reservoir member configured to absorb a fluid volume increase in the transmission system and provide fluid back into the transmission system wherein the reservoir member is formed as a substantially elongated member expandable along at least a portion of its length in a direction substantially normal to a longitudinal centerline of the reservoir member;
wherein the transmission system includes a pump and an actuator; and
wherein the pump is configured to receive fluid from the reservoir member, pressurize the received fluid and provide the pressurized fluid to the actuator.

13. The apparatus as defined in claim 12, further comprising a body member, wherein the reservoir member is latently arranged with the body member.

14. The apparatus as defined in claim 12, further comprising an accumulator, wherein the pump is fluidly coupled between the reservoir member and the actuator.

15. The apparatus as defined in claim 12, wherein the reservoir member is integrally formed from an elastically deformable material.

16. The apparatus as defined in claim 12, further comprising reinforcement for the reservoir member to prevent collapsing of the reservoir member under potential negative pressure in the transmission system.

17. The apparatus as defined in claim 12, further comprising reinforcement for the reservoir member to prevent over expansion of the reservoir member under potential high volume and/or pressure transients in the transmission system.

* * * * *